United States Patent
Park et al.

(10) Patent No.: US 9,738,218 B2
(45) Date of Patent: Aug. 22, 2017

(54) ASIC PACKAGING TYPE ELECTRONIC BRAKE LAMP SWITCH AND ELECTRONIC BRAKE SYSTEM APPLYING THE SAME

(71) Applicants: Hyundai Motor Company, Seoul (KR); Kia Motors Corporation, Seoul (KR); Truwin Co., Ltd., Daejeon (KR)

(72) Inventors: Han-Gil Park, Suwon-si (KR); Jae-Sung Heo, Suwon-si (KR); Chang-Hyun Lee, Seoul (KR); Ean-Soo Cho, Hwaseong-si (KR); Jeong-Seop Byeon, Daejeon (KR)

(73) Assignees: Hyundai Motor Company, Seoul (KR); Kia Motors Corporation, Seoul (KR); Truwin Co., Ltd., Daejeon (KR)

( * ) Notice: Subject to any disclaimer, the term of this patent is extended or adjusted under 35 U.S.C. 154(b) by 0 days.

(21) Appl. No.: 14/950,955

(22) Filed: Nov. 24, 2015

(65) Prior Publication Data

US 2016/0332564 A1 Nov. 17, 2016

(30) Foreign Application Priority Data

May 15, 2015 (KR) ........................ 10-2015-0067850

(51) Int. Cl.
*B60Q 1/44* (2006.01)

(52) U.S. Cl.
CPC .................................... *B60Q 1/441* (2013.01)

(58) Field of Classification Search
CPC .................................................... B60Q 1/441
USPC ........................................................ 340/479
See application file for complete search history.

(56) References Cited

U.S. PATENT DOCUMENTS

| | | | | |
|---|---|---|---|---|
| 4,170,723 A | * | 10/1979 | Arsoy ....................... | B60T 7/04 200/61.89 |
| 2007/0152805 A1 | * | 7/2007 | Noh ........................ | B60T 17/22 340/479 |
| 2009/0051408 A1 | * | 2/2009 | Shimizu ................. | H03K 17/97 327/510 |
| 2009/0152080 A1 | * | 6/2009 | Kim ....................... | B60Q 1/441 200/61.89 |
| 2013/0076465 A1 | * | 3/2013 | Hernandez-Oliver . | B60Q 1/441 335/205 |
| 2013/0211668 A1 | * | 8/2013 | Watanabe .............. | B60Q 1/441 701/36 |

(Continued)

FOREIGN PATENT DOCUMENTS

| | | |
|---|---|---|
| JP | 2007-508179 A | 4/2007 |
| JP | 2007-122543 A | 5/2007 |

(Continued)

*Primary Examiner* — Santiago Garcia
(74) *Attorney, Agent, or Firm* — Morgan Lewis & Bockius LLP

(57) ABSTRACT

An electronic brake lamp switch may include an application-specific integrated circuit (ASIC) configured to generate a signal for turning on a brake lamp, an first output signal, and a second output signal, respectively, when a brake pedal is pressed and configured to package electrical elements for preventing failure when the failure such as outside overvoltage, abnormal surge or short circuit able to be generated on an output terminal occurs, and a printed circuit board (PCB) configured to receive power for operating the application-specific integrated circuit and to which the ASIC is mounted.

8 Claims, 8 Drawing Sheets

(56) References Cited

U.S. PATENT DOCUMENTS

| | | | |
|---|---|---|---|
| 2013/0325236 A1* | 12/2013 | Endo | B60K 6/445 |
| | | | 701/22 |
| 2014/0361687 A1* | 12/2014 | Olson | B60Q 1/44 |
| | | | 315/80 |
| 2015/0108929 A1* | 4/2015 | Nobe | H02P 6/085 |
| | | | 318/400.3 |

FOREIGN PATENT DOCUMENTS

| | | |
|---|---|---|
| KR | 10-2005-0008028 A | 1/2005 |
| KR | 10-2005-0046420 A | 5/2005 |
| KR | 10-2013-0064665 A | 6/2013 |
| KR | 10-2014-0106902 A | 9/2014 |
| KR | 10-2015-0041408 A | 4/2015 |

* cited by examiner

FIG.7 (Prior Art)
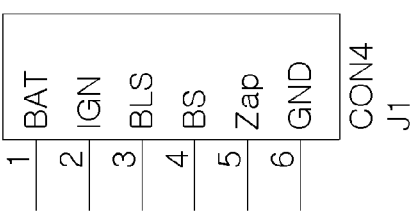
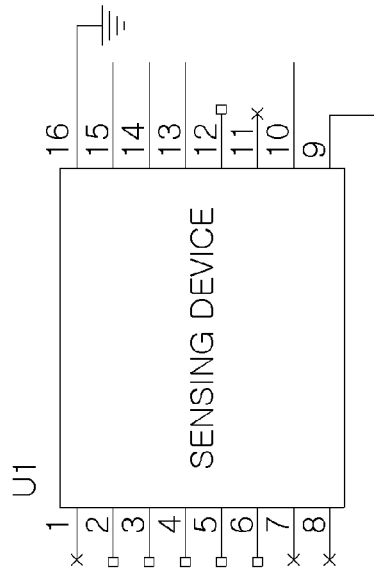

US 9,738,218 B2

ASIC PACKAGING TYPE ELECTRONIC BRAKE LAMP SWITCH AND ELECTRONIC BRAKE SYSTEM APPLYING THE SAME

CROSS-REFERENCE TO RELATED APPLICATION

The present application claims priority to Korean Patent Application No. 10-2015-0067850 filed May 15, 2015, the entire contents of which is incorporated herein for all purposes by this reference.

BACKGROUND OF THE INVENTION

Field of the Invention

The present invention relates to an electronic brake lamp switch, and more particularly, to an electronic brake system which may enable volume decrease and cost save as an electronic brake lamp switch is configured by using one Application-Specific Integrated Circuit (ASIC).

Description of Related Art

Generally, an electronic brake lamp switch is applied to an electronic brake system, and output information is transmitted to various kinds of vehicle devices by using OUTPUT1 and OUTPUT2 of the electronic brake lamp switch, and the electronic brake system is connected with an Engine Control Unit or Electronic Control Unit (ECU) such that a vehicle is controlled depending on the circumstances.

For this purpose, the electronic brake switch includes a sensing device which senses motion of a brake pedal, an output device which outputs a signal for turning on a lamp based on the sensing result, and a protecting device which protects a product from damage.

For example, the sensing device determines whether a driver pushes a brake pedal according to whether the brake pedal is pressed, and outputs a signal for turning on a brake lamp (right/left rear lamps and right/left rear upper lamps) when it is determined that a driver pushes the brake pedal. The output device generates OUTPUT1 and OUTPUT2 which are output by inverted images with each other using the output signal output from the sensing device, and supplies current to vehicle devices which are required for turning on the brake lamp or are related with turning on the brake lamp. The protecting device protects a product from damage by outside overvoltage or abnormal surge while the electronic brake lamp switch is operated.

Thereby, the electronic brake lamp switch, which detects operation of the brake pedal by a driver and outputs the turn on signal so as to turn on the brake lamp (right/left rear lamps and right/left rear upper lamps), is a significant constituent element for informing the operation of the brake pedal to drivers of following on vehicles.

However, the electronic brake lamp switch is manufactured by using one printed circuit board (PCB) in which various kinds of devices for constituting the sensing device, the output device, and the protecting device are mounted to be separated with each other. Therefore, the electronic brake lamp switch has fundamental limitations to reduce volume and save cost.

Referring to FIG. 6 to FIG. 8 according to prior art, the fundamental limitation occurs in the product volume viewpoint as the sensing device and the output device form about 70% of a PCB size to consider the related passive elements and the circuit of the protecting device which comprises Zener Diode, Diode, Resistor, Capacitor and so on forms about 20% of a PCB size. Further, the fundamental limitation occurs in the product cost viewpoint as a field effect transistor (FET) is used for realizing stable output.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an Application-Specific Integrated Circuit (ASIC) packaging type electronic brake lamp switch and an electronic brake system using the same having advantages of reducing a necessary space where a sensing device, an output device, and a protecting device form in a PCB by packaging the sensing device, the output device, and the protecting device into one ASIC, and particularly, enabling product volume decrease and cost save by reducing the necessary space.

According to various aspects of the present invention, an electronic brake lamp switch may include an application-specific integrated circuit (ASIC) configured to generate a signal for turning on a brake lamp, an first output signal, and a second output signal, respectively, when a brake pedal is pressed and configured to package electrical elements for preventing failure when the failure such as outside overvoltage, abnormal surge or short circuit able to be generated on an output terminal occurs, and a printed circuit board (PCB) configured to receive power for operating the application-specific integrated circuit and to which the ASIC is mounted.

The first output and the second output may be output by inverted images with each other.

The ASIC may include an oscillation circuit portion making a coil oscillation for determining whether the brake pedal is pressed, a power detector determining a criterion of On and Off operating the electronic brake lamp switch on overvoltage or low voltage, a data input circuit portion inputting information for adjusting an On and Off gap of the electronic brake lamp switch to correspond with the operation of the brake pedal, a protection circuit portion protecting against outside overvoltage or surge, first and second output devices outputting a first output and a second output, playing a role of short circuit protection for preventing failure when failure such as external short circuit occurs and carrying current of a battery with a built-in current limiting circuit, and an ASIC controller configured to connect with the oscillation circuit portion, the power detector, the data input circuit portion, the protection circuit portion, and the first and second output devices.

According to various aspects of the present invention, an electronic brake system may include an electronic brake lamp switch including an application-specific Integrated circuit (ASIC) configured to package a sensing device generating a signal for turning on a brake lamp when a brake pedal is pressed, an output device generating output signals of a first output and a second output for turning on the brake lamp by using an output signal generated from the sensing device, and a protecting device for protecting short circuit to prevent failure when the failure such as outside overvoltage, abnormal surge or short circuit able to be generated on an output terminal occurs; and a printed circuit board configured that power for operating the application-specific integrated circuit is supplied thereto and the application-specific integrated circuit is mounted thereat, a battery supplying power to the electronic brake lamp switch, a brake lamp operated by a first output signal of the first output of the electronic brake lamp switch, an Electronic Control Unit (ECU) connecting device operated by a second output signal of the second output of the electronic brake lamp switch, and a brake pedal configured that operation thereof is detected by the electronic brake lamp switch.

The electronic brake lamp switch may be configured to detect whether the brake pedal is pressed through a distance varying from a lamp switch detecting portion disposed at the brake pedal.

The distance varying may be recognized to the application-specific Integrated circuit.

The brake lamp may be separated into a right rear lamp, a left rear lamp, and a rear upper lamp of a vehicle, and the brake lamp may receive the first output signal through a relay.

The ECU connecting device may include a Vehicle Dynamic Control (VDC) and an Electronic Chromic Mirror (ECM).

The present invention applies the ASIC, which is configured to reduce a space occupied in the PCB, to an electronic brake lamp switch such that advantages and effects as mentioned below may be realized.

Firstly, outside outputs and protection devices except sensor portion are removed such that product may be miniaturized. Secondly, a mounting space in a vehicle may be ensured and work may be easy by miniaturizing product. Thirdly, cost may be saved by deleting components. Fourthly, materials management and process may be simplified by deleting components. Fifthly, a circuit structure may be simplified. Sixthly, field inferiority rate may be minimized by simplifying a circuit structure. Seventhly, domestic and foreign quality index can be improved as field inferiority rate is to be minimized.

In addition, the electronic brake system is configured together with the electronic brake lamp switch to which the ASIC is applied in the present invention. Thus, the electronic brake system realizes more compact composition and low cost in comparison with a conventional electronic brake system not applying the ASIC, and particularly, the circuit of the electronic brake system according to the present invention is simplified, thereby reducing failure probability and improving early quality and durability quality of a vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 to FIG. 8 are schematic diagrams of a PCB circuit which is applied to an electronic brake lamp switch according to a prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
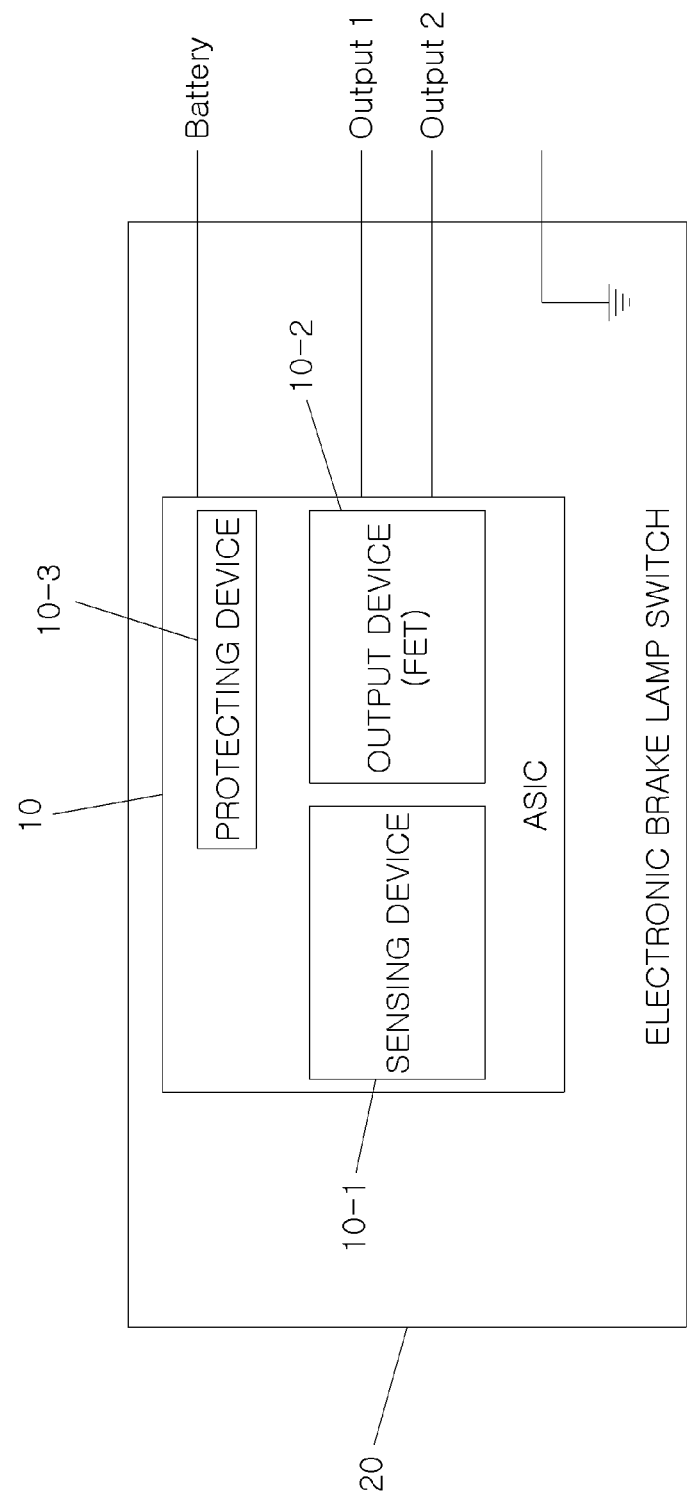
FIG. 1 is a schematic diagram of an exemplary Application-Specific Integrated Circuit (ASIC) type electronic brake lamp switch according to the present invention.
Figure 2:
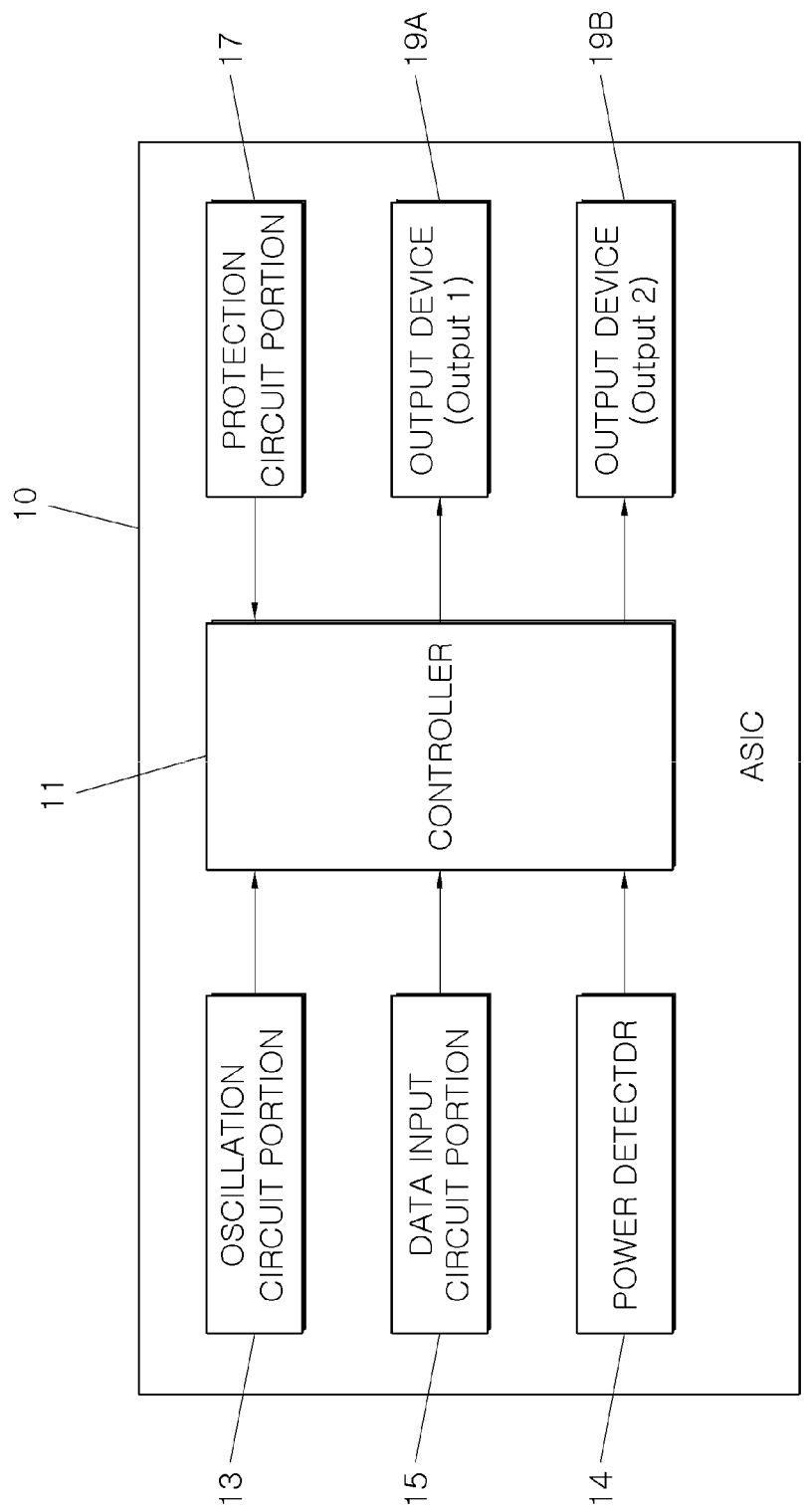
FIG. 2 is a block diagram showing basic internal compositions of the exemplary ASIC applied to FIG. 1.
Figure 3:
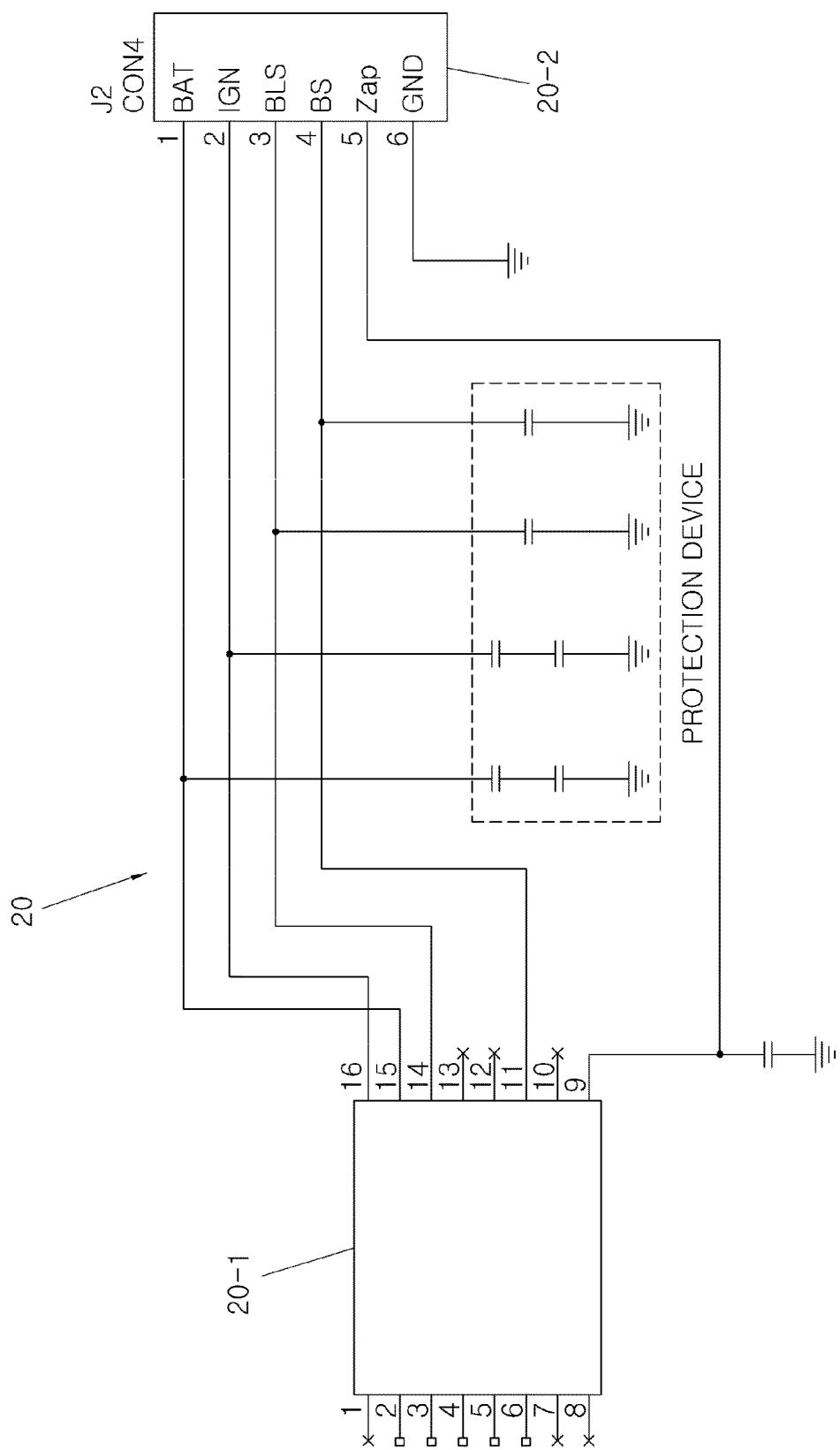
FIG. 3 is a schematic diagram of a circuit of a PCB applied to FIG. 1.

FIG. 1 to FIG. 3 represent composition of an Application-Specific Integrated Circuit (ASIC) type electronic brake lamp switch according to various embodiments of the present invention.

Referring to FIG. 1, an electronic brake lamp switch 1 may include a sensing device 10-1, an output device 10-2, a protecting device 10-3, an Application-Specific Integrated Circuit (hereinafter, referred to as ASIC) 10, and a Printed Circuit Board (hereinafter, referred to as PCB) 20 in which the ASIC 10 is mounted.

Concretely, the sensing device 10-1 determines whether a brake pedal is pushed so as to output a signal for turning on a brake lamp when it is determined that a driver pushes the pedal. The output device 10-2 supplies current to vehicle devices, which are required for turning on the brake lamp or are related with turning on the brake lamp, by using the output signal generated from the sensing device 10-1. For this purpose, the output device 10-2 uses a field effect transistor (FET). The protecting device 10-3 protects a product against damage by outside overvoltage or abnormal surge and performs a function for preventing failure when failure such as outside overvoltage, abnormal surge, or short circuit which may be generated on an output terminal occur while the electronic brake lamp switch 1 is operated.

Concretely, the ASIC 10 integrates the sensing device 10-1, the output device 10-2, and the protecting device 10-3 such that a circuit of the PCB 20 is not individually connected with each of the sensing device 10-1, the output device 10-2, and the protecting device 10-3.

FIG. 2 represents internal compositions of the ASIC 10. As shown in FIG. 2, the ASIC 10 may include an ASIC controller 11, an oscillation circuit portion 13, a power detector 14, a data input circuit portion 15, a protection circuit portion 17, and first and second output devices 19A and 19B.

The ASIC controller 11 controls operations of the oscillation circuit portion 13, the power detector 14, the data input circuit portion 15, the protection circuit portion 17, the first and second output devices 19A and 19B and so on. The oscillation circuit portion 13 makes a coil oscillation in order to determine whether the brake pedal is pressed. The power detector 14 determines a criterion of On and Off operating the electronic brake lamp switch 1 on overvoltage or low voltage. The data input circuit portion 15 may input information to the ASIC controller 11 for adjusting an On and Off gap of the electronic brake lamp switch 1 to correspond with the operation of the brake pedal and be connected with sensing device 10-1. The protection circuit portion 17 may play a role of protecting the ASIC 10 against outside overvoltage or surge and be connected with the protecting device 10-3. The first and second output devices 19A and 19B are respectively communicated with OUTPUT1 and OUTPUT2 of the output device 10-2 which are two kinds of output so as to carry current of a battery for turning on the brake lamp. Especially, the first and second output devices 19A and 19B outputting an OUTPUT1 and an OUTPUT2, playing a role of short circuit protection for preventing failure when failure such as external short circuit occurs and carrying current of a battery with a built-in current limiting circuit.

Concretely, the PCB 20 provides a space where the ASIC 10 is mounted in. Therefore, entire size of the PCB 20 can be reduced as the space, where ASIC 10 occupies, is to be small. It is because the sensing device 10-1/the output device 10-2 which form about 70% of the PCB 20 size and the protecting device 10-3 which forms about 20% of the PCB 20 size are packaged into the one ASIC 10.

FIG. 3 represents a connecting section structure of the PCB 20. As shown in FIG. 3, the PCB 20 forms a connecting section structure in which a PCB sensing device 20-1 is connected to a PCB connector 20-2, and protection devices such as Zener Diode, Diode, Resistor, Capacitor used to the connecting section structure are used very few in number. The PCB sensing device 20-1 is connected with the sensing device 10-1. The PCB connector 20-2 is connected with the ASIC 10. Therefore, entire size and volume of the PCB 20 can be reduced as a portion for forming the connecting section structure is able to be very small.

Thus, the PCB 20, that entire size is to be very reduced as the circuit structure becomes simplified together with the ASIC 10, is used to the electronic brake lamp switch 1 such that a product can be miniaturized, a mounting space can be ensured, work can be easy, cost can be saved, materials management and process can be simplified, field inferiority rate can be minimized, and quality can be improved.

Figure 4:
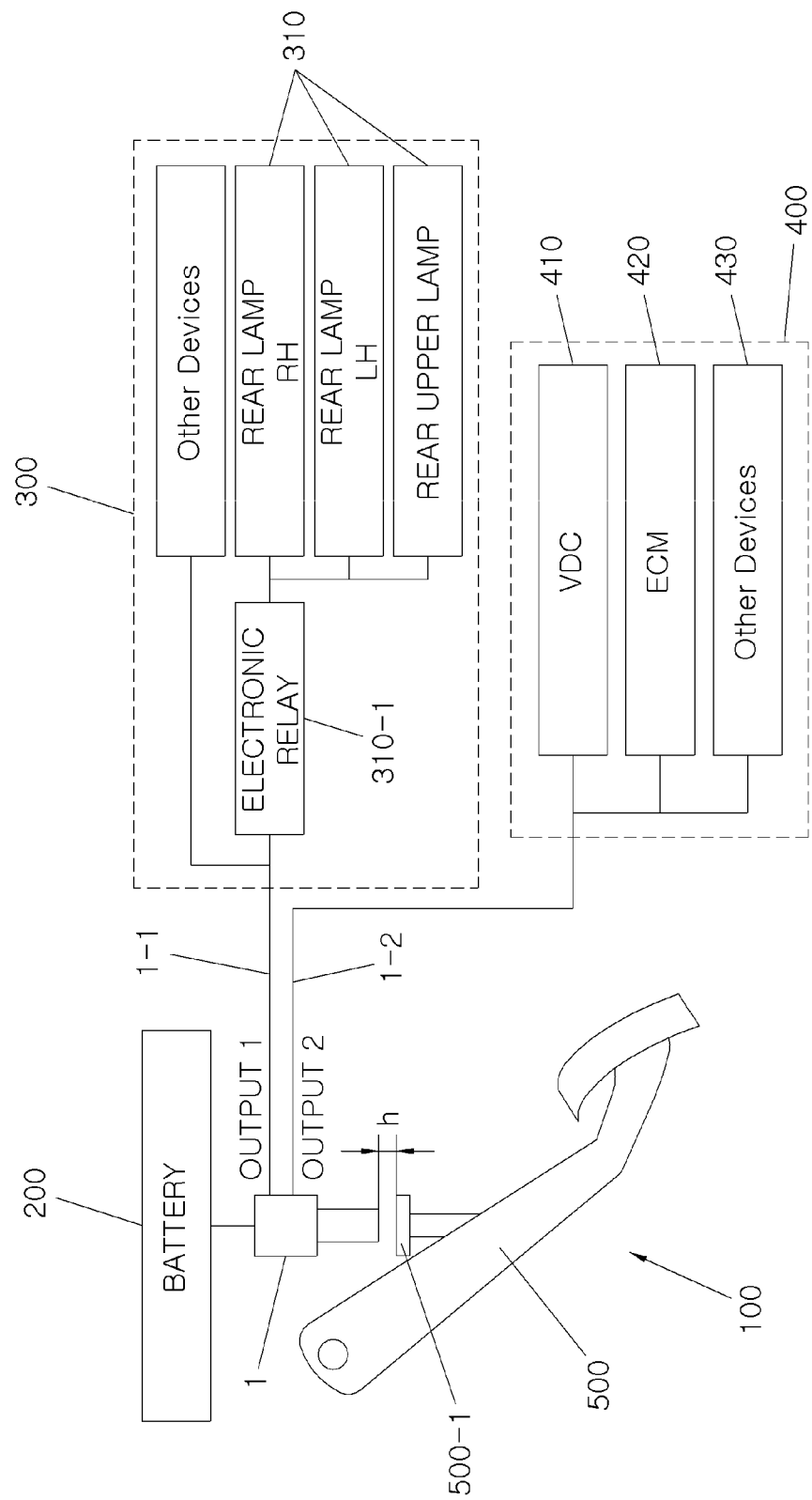
FIG. 4 is a schematic diagram of an electronic brake pedal system to which an exemplary ASIC type electronic brake lamp switch according to the present invention is applied.

Meanwhile, FIG. 4 represents composition of an electronic brake pedal system to which an ASIC type electronic brake lamp switch according to the present invention is applied.

As shown in FIG. 4, an electronic brake system 100 may include the electronic brake lamp switch 1, a battery 200 which is provided to a vehicle so as to supply power to the electronic brake lamp switch 1, a first output operating device 300 which is operated by a first output signal 1-1 of the electronic brake lamp switch 1, a second output operating device 400 which is operated by a second output signal 1-2 of the electronic brake lamp switch 1, and a brake pedal 500 which is adapted that its operation is detected by the electronic brake lamp switch 1. In addition, the electronic brake system 100 is communicated with an Engine Control Unit or an Electronic Control Unit (ECU) such that the vehicle is controlled depending on the circumstances of the vehicle. A circuit structure for communicating the electronic brake system 100 with the Engine Control Unit or the Electronic Control Unit (ECU) is same to an ordinary type.

Concretely, the electronic brake lamp switch 1 is the electronic brake lamp switch 1 described above referring to FIG. 1 to FIG. 3. Particularly, the first and second output signals 1-1 and 1-2 are respectively communicated with OUTPUT1 and OUTPUT2 of the output device 10-2 which is integrated on the ASIC 10. The first output signal 1-1 is outputted to first output operating device 300, and the second output signal 1-2 is outputted by inverted images with the first output signal 1-1 such that an output information of the brake lamp switch is transmitted to various vehicle devices of the second output operating device 400.

Concretely, the first output operating device 300 may include brake lamp 310 which is connected with the first output signal 1-1 through a relay 310-1 disposed at the first output signal 1-1, and may include many other vehicle devices. The brake lamp 310 may be separated by a right rear lamp, a left rear lamp, and a rear upper lamp.

Concretely, the second output operating device 400 may include a Vehicle Dynamic Control (VDC) 410 and an Electronic Chromic Mirror (ECM) 420 which are connected with the second output signal 1-2 and may include many other vehicle devices. The VDC 410 automatically controls a brake system of each wheel such that driving stability of the vehicle is ensured when the vehicle drives on the rainy road, the snowy road, or the irregular road or quickly turns with high-speed driving. The ECM 420 automatically senses on the rear vehicle's light illuminated to a room mirror through a photo sensor and decreases reflectivity of the mirror so as to prevent driver's glare.

Concretely, the brake pedal 500 is pushed by a driver to operate the brake system, and a lamp switch detecting portion 500-1 is disposed at the brake pedal 500 so as to detect a distance varying from the ASIC 10 of the electronic brake lamp switch 1 thereto.

Figure 5:
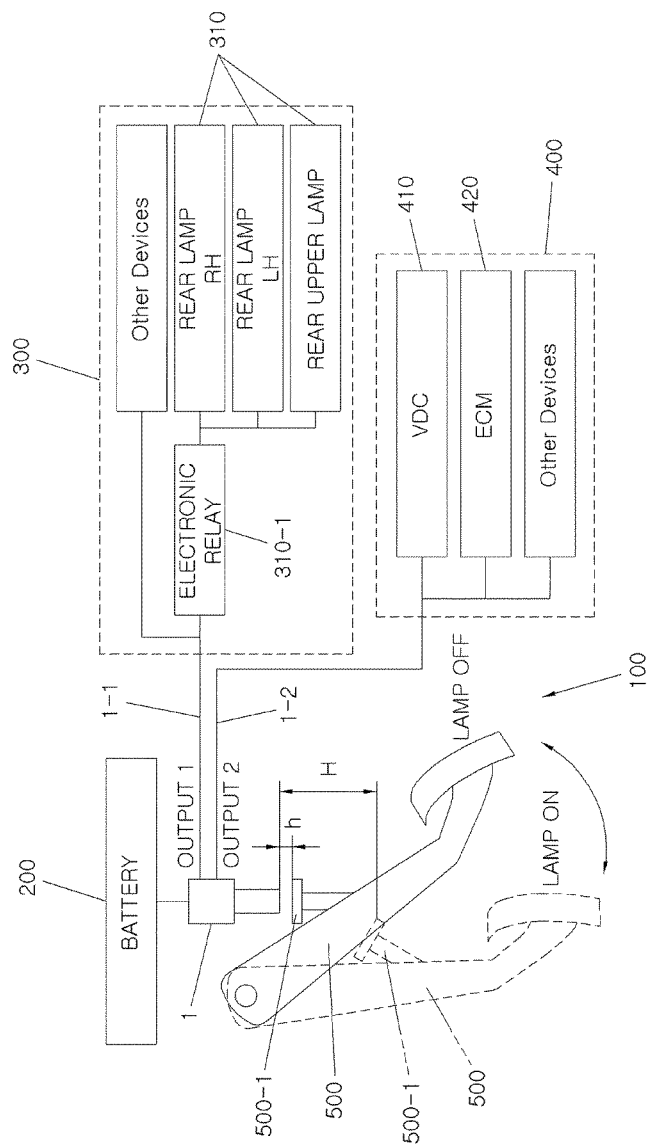
FIG. 5 illustrates state of operating the electronic brake system of FIG. 4.
Figure 6:
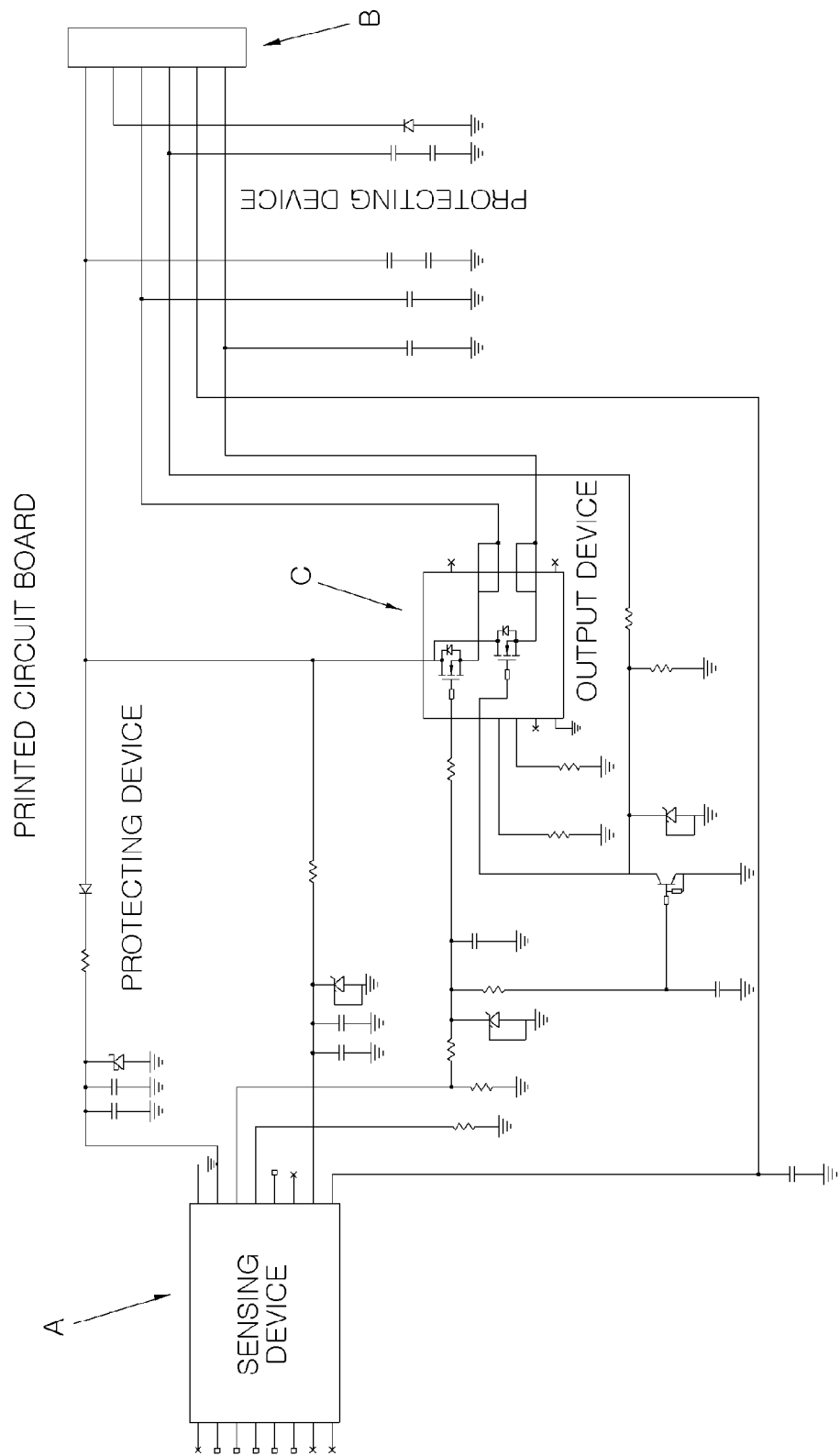
Figure 8:
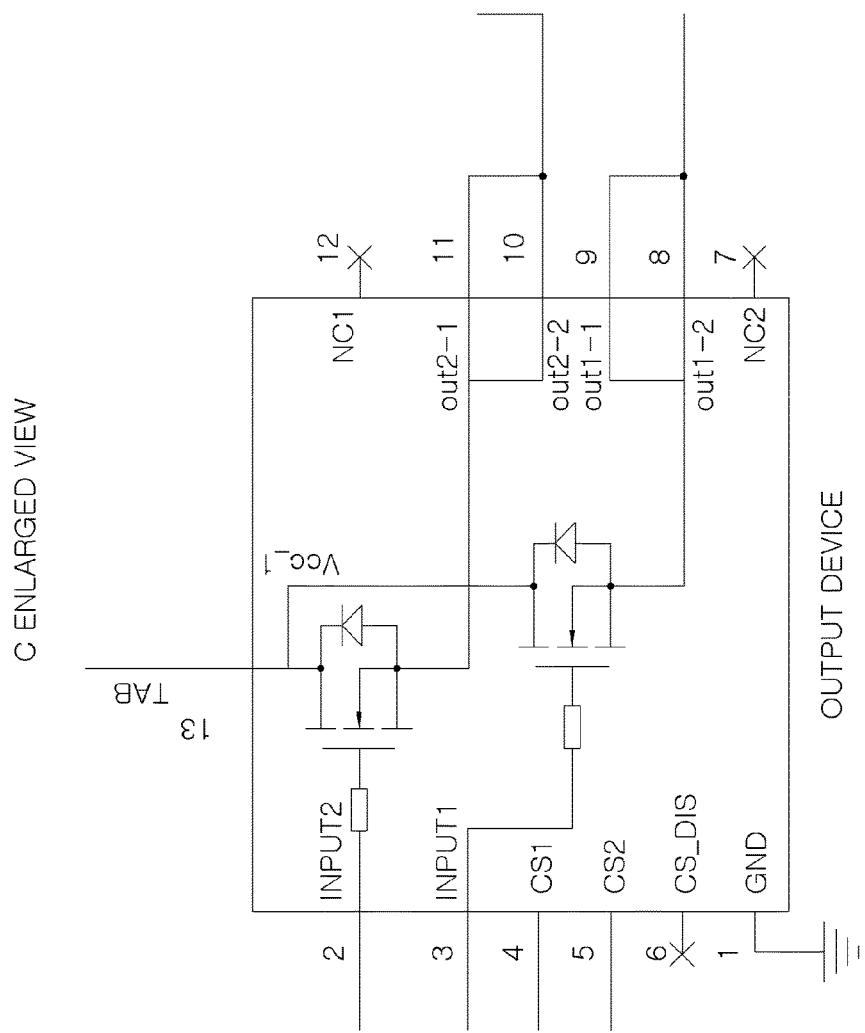

Referring to FIG. 5, there is a non-detected distance h which is not detected between the lamp switch detecting portion 500-1 and the electronic brake lamp switch 1 on the state that the brake pedal 500 is mounted at the vehicle such that the electronic brake lamp switch 1 is not operated when the brake pedal 500 is not operated. As a result, the electronic brake lamp switch 1 does not generate the first and second output signals 1-1 and 1-2.

On the contrary, the electronic brake lamp switch 1 is operated as the ASIC 10 is operated when the brake pedal 500 is operated. Referring to FIG. 2, the ASIC controller 11 of the ASIC 10 controls such that the oscillation circuit portion 13 makes a coil oscillation for determining whether the brake pedal is pressed, and a data input circuit portion 15 inputs information about the non-detected distance h and a detected distance H of the lamp switch detecting portion 500-1 for adjusting an On and Off gap of the electronic brake lamp switch 1 to correspond with the operation of the brake pedal 500, and the first and second output devices 19A and 19B carry current of a battery for turning on the brake lamp.

Therefore, the lamp switch detecting portion 500-1 is downwardly moved together with the pressed brake pedal 500 such that a distance between the lamp switch detecting portion 500-1 and the electronic brake lamp switch 1 is changed from the non-detected distance h to the detected distance H. Thus, the electronic brake lamp switch 1 is operated. As a result, the electronic brake lamp switch 1 generates the first output signal 1-1 such that the right rear lamp, the left rear lamp, and the rear upper lamp of the brake lamp 310 are turned on and generates the second output signal 1-2 such that the VDC 410 or the ECM 420 are operated with connected to the ECU.

Thereby, the electronic brake system 100 is provided together with the electronic brake lamp switch 1 to which the ASIC 10 is applied. Thus, the electronic brake system 100 has more compact composition and low cost in comparison with a conventional electronic brake lamp switch not applying the ASIC, and particularly, the circuit structure of the electronic brake system according to the present invention is simplified, thereby reducing failure probability and greatly improving early quality and durability quality of a vehicle.

According to various embodiments, the electronic brake system 100 applies the electronic brake lamp switch 1. The entire size and volume of the PCB 20 may be reduced, and the cost of the PCB 20 may be saved by applying the ASIC 10 as the electronic brake lamp switch 1 includes the Application-Specific Integrated Circuit (ASIC) 10 which is configured that the sensing device 10-1, the output device 10-2, and the protecting device 10-3 for turning on the brake lamp when the brake pedal 500 is pressed are packaged thereinto, and the Printed Circuit Board (PCB) 20 which is configured that the ASIC 10 is mounted therein so as to supply power for operating the ASIC 10. Particularly, failure probability may be decreased and early quality and durability quality of a vehicle may be improved as the electronic brake system 100 has the compact and simple circuit.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic brake lamp switch comprising:
   an application-specific integrated circuit (ASIC) configured to generate a signal for turning on a brake lamp, an first output signal, and a second output signal, respectively, when a brake pedal is pressed and configured to package electrical elements for preventing failure when the failure such as outside overvoltage, abnormal surge or short circuit able to be generated on an output terminal occurs; and
   a printed circuit board (PCB) configured to receive power for operating the application-specific integrated circuit and to which the ASIC is mounted,
   wherein the PCB includes a PCB sensing device which is connected with a sensing device, a PCB connector which is connected with the ASIC, and protection devices, and wherein the PCB forms a connecting section structure in which the PCB sensing device is connected to the PCB connector and the protection devices used to the connecting section structure.

2. The electronic brake lamp switch of claim 1, wherein the first output and the second output are output by inverted images with each other.

3. The electronic brake lamp switch of claim 1, wherein the ASIC comprises:
   an oscillation circuit portion making a coil oscillation for determining whether the brake pedal is pressed;
   a power detector determining a criterion of On and Off operating the electronic brake lamp switch on overvoltage or low voltage;
   a data input circuit portion inputting information for adjusting an On and Off gap of the electronic brake lamp switch to correspond with the operation of the brake pedal;
   a protection circuit portion protecting against outside overvoltage or surge;
   first and second output devices outputting a first output and a second output, playing a role of short circuit protection for preventing failure when failure such as external short circuit occurs and carrying current of a battery with a built-in current limiting circuit; and
   an ASIC controller configured to connect with the oscillation circuit portion, the power detector, the data input circuit portion, the protection circuit portion, and the first and second output devices.

4. An electronic brake system comprising:
   an electronic brake lamp switch including an application-specific Integrated circuit (ASIC) configured to package a sensing device generating a signal for turning on a brake lamp when a brake pedal is pressed, an output device generating output signals of a first output and a second output for turning on the brake lamp by using an output signal generated from the sensing device, and a protecting device for protecting short circuit to prevent failure when the failure such as outside overvoltage, abnormal surge or short circuit able to be generated on an output terminal occurs; and a printed circuit board configured that power for operating the application-specific integrated circuit is supplied thereto and the application-specific integrated circuit is mounted thereat;
   a battery supplying power to the electronic brake lamp switch;
   a brake lamp operated by a first output signal of the first output of the electronic brake lamp switch;
   an Electronic Control Unit (ECU) connecting device operated by a second output signal of the second output of the electronic brake lamp switch; and
   a brake pedal configured that operation thereof is detected by the electronic brake lamp switch,
   wherein the printed circuit board includes a printed circuit board sensing device which is connected with the sensing device, a printed circuit board connector which is connected with the application-specific integrated circuit, and the protection devices, and the printed circuit board forms a connecting section structure in which the printed circuit board sensing device is connected to the printed circuit board connector and the protection devices used to the connecting section structure.

5. The electronic brake system of claim 4, wherein the electronic brake lamp switch is configured to detect whether the brake pedal is pressed through a distance varying from a lamp switch detecting portion disposed at the brake pedal.

6. The electronic brake system of claim 5, wherein the distance varying is recognized to the application-specific Integrated circuit.

7. The electronic brake system of claim 4, wherein the brake lamp is separated into a right rear lamp, a left rear lamp, and a rear upper lamp of a vehicle, and the brake lamp receives the first output signal through a relay.

8. The electronic brake system of claim 4, wherein the ECU connecting device includes a Vehicle Dynamic Control (VDC) and an Electronic Chromic Mirror (ECM).

* * * * *